(12) United States Patent
Ojiro et al.

(10) Patent No.: US 10,605,485 B2
(45) Date of Patent: Mar. 31, 2020

(54) WATER HEATER

(71) Applicant: Rinnai Corporation, Nagoya-shi, Aichi (JP)

(72) Inventors: Takashi Ojiro, Nagoya (JP); Yasuo Niwa, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 69 days.

(21) Appl. No.: 15/770,506

(22) PCT Filed: Oct. 24, 2016

(86) PCT No.: PCT/JP2016/081440
§ 371 (c)(1),
(2) Date: Apr. 24, 2018

(87) PCT Pub. No.: WO2017/073515
PCT Pub. Date: May 4, 2017

(65) Prior Publication Data
US 2018/0313577 A1    Nov. 1, 2018

(30) Foreign Application Priority Data
Oct. 26, 2015   (JP) .................. 2015-209695

(51) Int. Cl.
*F22B 21/34* (2006.01)
*F24H 8/00* (2006.01)
(Continued)

(52) U.S. Cl.
CPC .................. *F24H 8/00* (2013.01); *F23L 5/02* (2013.01); *F24H 1/145* (2013.01); *F24H 9/02* (2013.01); *Y02B 30/102* (2013.01)

(58) Field of Classification Search
CPC ............................ F22B 21/348; F24H 1/206
(Continued)

(56) References Cited

U.S. PATENT DOCUMENTS 5,197,415 A * 3/1993 Stretch .................... F23C 3/004
122/14.22
5,699,756 A * 12/1997 Ross ...................... F24H 1/206
122/161
(Continued)

FOREIGN PATENT DOCUMENTS

JP        64-153433      10/1979
JP        2001-021225    1/2001
(Continued)

OTHER PUBLICATIONS

International Search Report and Written Opinion for International Application Serial No. PCT/2016/081440 dated Jan. 17, 2017,8 pgs.
International Preliminary Report on Patentability for International Application No. PCT/JP2016/081440 dated May 11, 2018.

*Primary Examiner* — Gregory A Wilson
(74) *Attorney, Agent, or Firm* — Amin, Turocy & Watson, LLP

(57) ABSTRACT

A water heater having a casing (100) in which a burner body (1) and a fan case (2) are accommodated, wherein the burner body (1) includes a main burner body unit (12) having a flat burner (3) on a lower surface thereof, and an introducing unit (11) projected from an upper surface of the main burner body unit (12), wherein the introducing unit (11) has an inlet port (10) communicated with the fan case (2), and an fan installation surface (13) having the inlet port (10) is provided so as to face to a front direction or a diagonally front direction as viewed from a frontward direction.

8 Claims, 6 Drawing Sheets

(51) Int. Cl.
*F23L 5/02* (2006.01)
*F24H 9/02* (2006.01)
*F24H 1/14* (2006.01)

(58) Field of Classification Search
USPC ........................................................ 122/18.3
See application file for complete search history.

(56) References Cited

U.S. PATENT DOCUMENTS

| | | | | |
|---|---|---|---|---|
| 6,036,480 | A * | 3/2000 | Hughes | F23D 14/24 |
| | | | | 122/249 |
| 7,415,943 | B2 * | 8/2008 | Missoum | F24H 1/287 |
| | | | | 122/18.1 |
| 7,559,293 | B2 * | 7/2009 | Gordon | F24H 1/205 |
| | | | | 122/13.01 |
| 7,634,977 | B2 * | 12/2009 | Smith | F24H 1/206 |
| | | | | 122/13.01 |
| 2014/0053791 | A1 * | 2/2014 | Boros | F24H 1/206 |
| | | | | 122/18.3 |
| 2018/0195760 | A1 * | 7/2018 | Kouduki | F24H 1/145 |
| 2018/0356126 | A1 * | 12/2018 | Zhang | F24H 1/205 |

FOREIGN PATENT DOCUMENTS

| | | |
|---|---|---|
| JP | 2013-234821 | 11/2013 |
| JP | 2015-183879 | 10/2015 |
| WO | 2014019835 | 2/2014 |

\* cited by examiner

PRIOR ART

WATER HEATER

FIELD OF THE INVENTION

The present invention relates to a water heater. Especially, the present invention relates to the water heater having a downward combustion type burner.

BACKGROUND ART

FIG. 6 is a schematic configuration view of a water heater including a downward combustion type-flat burner (3a) disposed on a lower surface of a burner body (40) in such a manner that a combustion surface (30a) is disposed facedown. In the water heater, the burner body (40) is provided in an upper region of the casing (4).

Additionally, a sensible heat recovery type-primary heat exchanger (311) is disposed below the combustion surface (30a) of the flat burner (3a), and a latent heat recovery type-secondary heat exchanger (321) is disposed below the sensible heat recovery type-primary heat exchanger (311).

In such a water heater, all air taken in by rotating a fan (not shown) in a fan case (41) is fed as primary combustion air to the flat burner (3a) in such a manner that the combustion surface (30a) is disposed facedown in the burner body (40). Moreover, fuel gas is supplied from a gas supply pipe (44) to a plurality of gas nozzles (42) provided above the flat burner (3a). The fuel gas is mixed with the above-described primary combustion air, and then is fed to the flat burner (3a).

In the above-described water heater, in order to minimize the height of the upper region of the casing (4), the fan case is laid on its side so as not to be in a vertical standing posture, so that a blowout port (45) which opens to one side of the fan case (41) is communicated with an inlet port (310) which opens to one side surface of the burner body (40), as illustrated in FIG. 6. In this configuration, the burner body (40) and the fan case (41) are aligned in a left-and-right direction, which results in reducing the overall height of the casing (4).

However, in such a conventional installation structure of the fan case (41) shown in FIG. 6, the fan inside the fan case (41) is also installed in a state laid on its side. Therefore, when a diameter of the fan becomes large, a diameter of the fan case (41) also becomes large. As a result, as illustrated in FIG. 6, there is a problem that an installation of the fan case (41) on a lateral side of the burner body (40) increases a width in the left-and-right direction of the casing (4). Moreover, there is a problem that when the fan case (41) is installed in front of, or in rear of the burner body (40), a depth of the casing (4) increases.

PRIOR ARTS

Patent Publication

[Patent Publication 1] Japanese Unexamined Patent Publication No. 2013-234821 A

SUMMARY OF INVENTION

The present invention has been made to solve the problems described above, and an object of the present invention is to make a casing more compact in all directions of a height direction, a front-and-rear direction, and a left-and-right direction, and to enhance workability of installation work of a fan case to a burner body and the like in a water heater including an all primary air combustion type burner having a downward combustion surface.

According to the present invention, there is provided a water heater comprising a casing including a casing body having an opening in a front portion, and a door configured to open and close the opening, wherein
the casing accommodates,
a burner body including a flat burner having a downward combustion surface,
a fan case lying on its side in such a manner that a suction port configured to take in air opens downward, and a blowout port communicating with the burner body to blow out the air opens laterally,
a fan disposed inside the fan case and configured to supply a mixture gas of combustion air and fuel gas into the burner body, and
a motor provided above the fan case and configured to rotate the fan, wherein
the burner body includes a main burner body unit having the flat burner on a lower surface thereof, and an introducing unit that is projected from a predetermined position of an upper surface of the main burner body unit, is communicated with the main burner body unit, and has an inlet port opposed to the blowout port of the fan case,
a side surface of the introducing unit where the inlet port opens has a fan installation surface connected to the blowout port of the fan case,
the fan case includes a scroll casing, and
the fan includes a clockwise or counterclockwise centrifugal fan in plan view from a motor side, wherein
when the fan includes the clockwise centrifugal fan, the fan case is installed on the right side of the burner body, and the fan installation surface is provided so as to face to a front direction or a diagonally right front direction, and
when the fan includes the counterclockwise centrifugal fan, the fan case is installed on the left side of the burner body, and the fan installation surface is provided so as to face to the front direction or a diagonally left front direction.

Other objects, features and advantages of the present invention will become more fully understood from the detailed description given hereinbelow and the accompanying drawings.

DESCRIPTION OF EMBODIMENTS

Hereinafter, referring to drawings, a water heater according to a first embodiment of the present invention will be described in detail.

Figure 1:
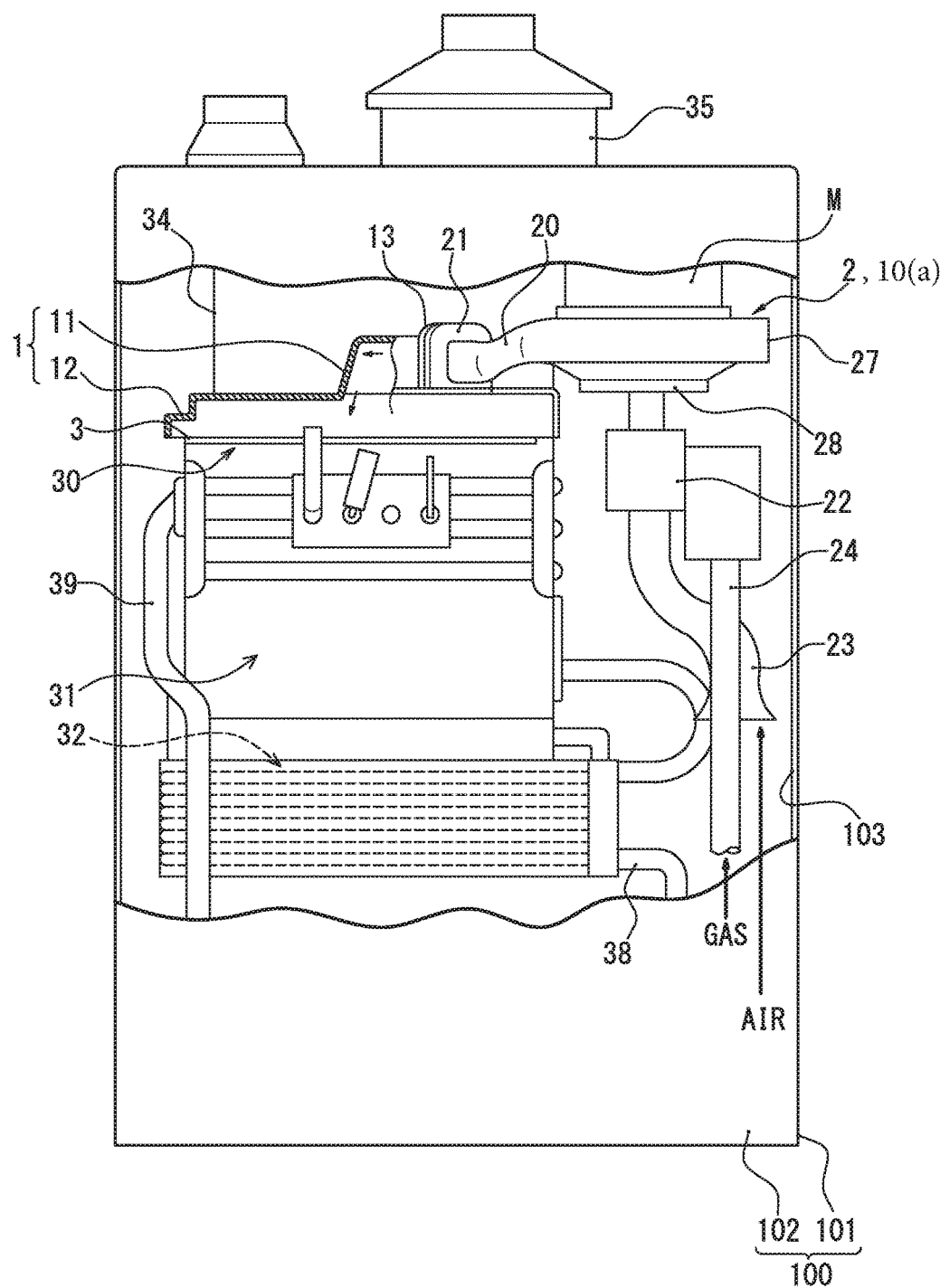
FIG. 1 is a schematic configuration view showing one example of a water heater according to a first embodiment of the present invention.

FIG. 1 is a schematic configuration view of a latent heat recovery type-gas water heater including an all primary air combustion type-flat burner (3), as viewed from a frontward direction provided with a door (102). A casing (100) includes a rectangular box shaped casing body (101) having an opening (103) in a front portion, and the door (102) opening/closing the opening (103). In this specification, a side on which the door (102) of the casing (100) is provided is referred to as a front side, an opposite side facing the door (102) is referred to as a rear side, a direction in which those oppose each other is referred to as a front-and-rear direction, a lateral direction orthogonal to the front-and-rear direction is referred to as a left-and-right direction, and a height direction orthogonal to the front-and-rear direction is referred to as an up-and-down direction.

The casing (100) accommodates a burner body (1) provided with the flat burner (3) having a downward combustion surface (30), and a fan case (2) communicated with the burner body (1), and the flat burner (3) and the fan case (2) are aligned in the left-and-right direction. Inside the fan case (2), a centrifugal fan (not shown) for supplying a mixture gas of air and fuel gas to the flat burner (3) provided on a lower surface of the burner body (1) is housed.

First and second heater exchangers (31) and (32) for supplying hot water that are heated by combustion exhaust gas from the flat burner (3), are consecutively disposed below the burner body (1) or below the flat burner (3). A mixing device (22) for mixing the air with the fuel gas is disposed upstream of the fan case (2) through a suction port (28) of the fan case (2). An air supply pipe (23) for supplying the air and a gas supply pipe (24) for supplying the fuel gas are coupled to the mixing device (22). In the present specification, following a passage formed by rotation of the fan, a side of the fan case (2) is referred to as an upstream side, and a side of the burner body (1) is referred to as a downstream side.

The flat burner (3) includes a ceramic combustion plate having many flame ports opening downwardly or a combustion mat made by knitting metal fabric woven like a net, and has the downward combustion surface (30). The flat burner (3) is of the all primary air combustion type, and burns the mixture gas obtained by mixing all air as primary combustion air supplied from the air supply pipe (23) into the mixing device (22) with the fuel gas.

Amounts of the air and the fuel gas in the mixture gas produced in the mixing device (22) are adjusted by changing a rotation speed of a motor (M) for rotating the fan (10a) above the fan case (2).

The first heat exchanger (31) is of the sensible heat recovery type and is disposed in an intermediate region of the casing (100) in the up-and-down direction, and the second heat exchanger (32) is of the latent heat recovery type and is continuously connected to a bottom part of the first heat exchanger (31). Therefore, water supplied through a water supply pipe (38) connected to an upstream side of the second heat exchanger (32) is heated by latent heat of the combustion exhaust gas from the flat burner (3) in the second heat exchanger (32), and is then heated by sensible heat of the combustion exhaust gas in the first heat exchanger (31). Subsequently, the water heated to a predetermined temperature is discharged through a hot-water supply pipe (39) connected to a downstream side of the first heat exchanger (31).

The combustion exhaust gas passing through the second heat exchanger (32) is discharged through an exhaust duct (34) and an exhaust cylinder (35) protruding from a top surface of the casing body (101) to the outside. Although not shown, drain generated in the second heat exchanger (32) is recovered by a drain receiver to be discharged to the outside after neutralized by a neutralizer.

In the water heater described in the first embodiment shown in FIG. 1, a clockwise fan is housed in the fan case (2), and inside the casing (100), the fan case (2) is disposed in a state laid on its side on the right side of the burner body (1) so that the suction port (28) faces downward.

Figure 2:
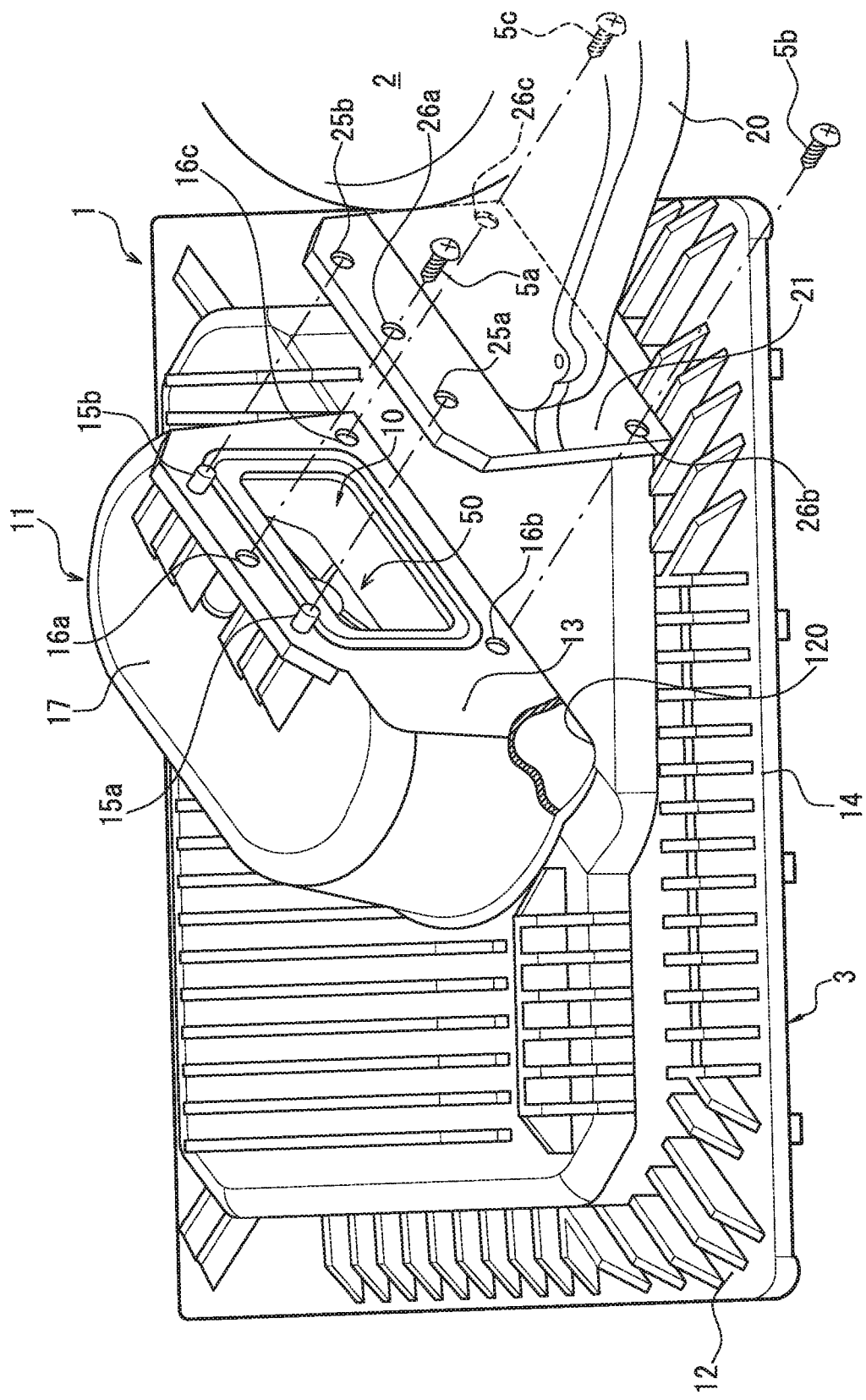
FIG. 2 is a schematic partial cut-away perspective view showing one example of an installation process of a fan case to a burner body in the water heater according to the first embodiment of the present invention.
Figure 3:
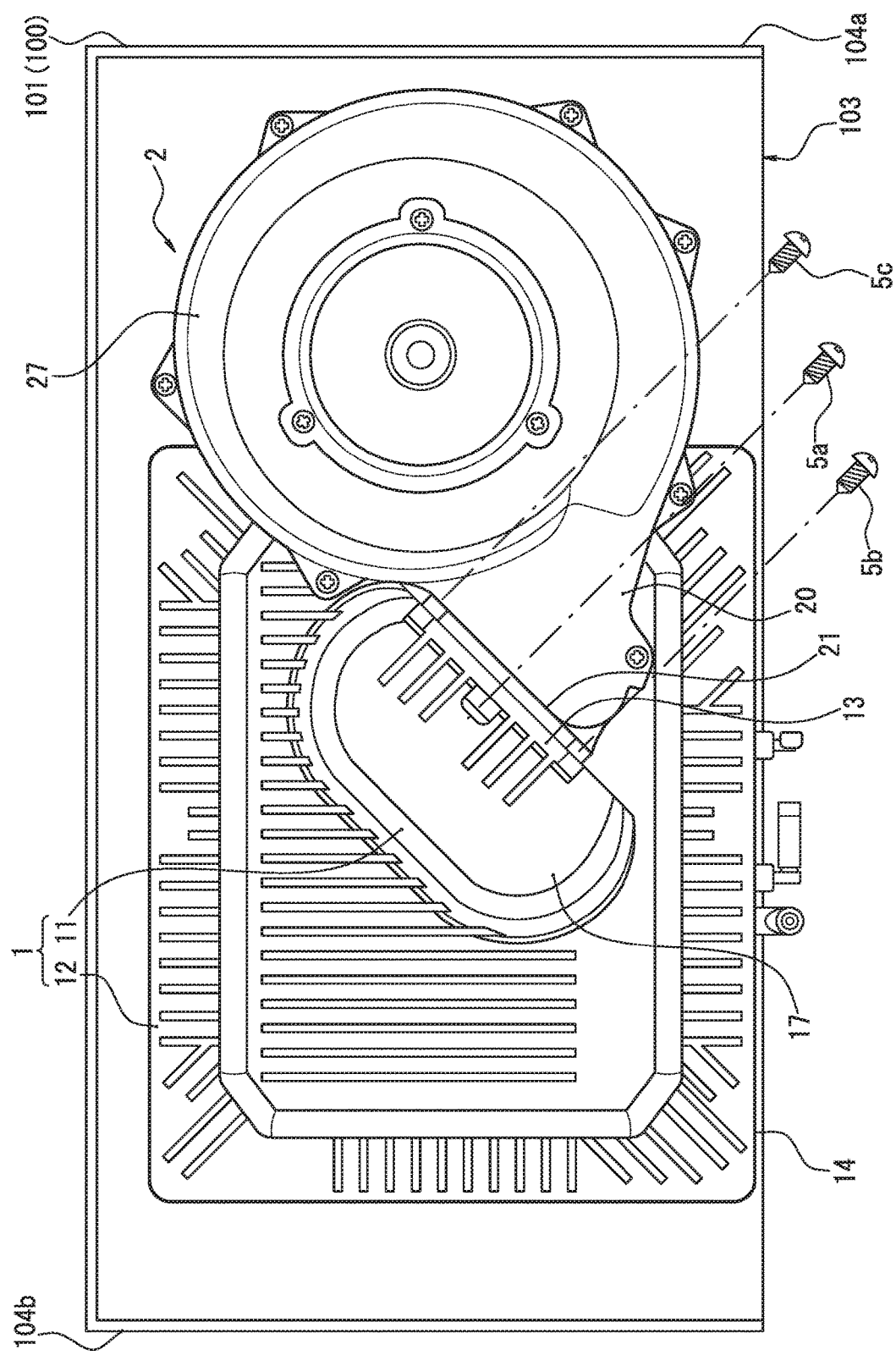
FIG. 3 is a schematic plan view showing one example of the burner body and the fan case of the water heater according to the first embodiment of the present invention.

As illustrated in FIG. 2, the burner body (1) includes: a rectangular flat shaped main burner body unit (12) that has an introduction port (120) formed in a substantially central portion of an upper surface, and the flat burner (3) provided on the lower surface; and an introducing unit (11) that is communicated with the introduction port (120), and is projected upward from the upper surface of the main burner body unit (12). The introducing unit (11) includes wall sections as a peripheral wall standing on the upper surface of the main burner body unit (12), and an upper wall (17) covering an upper portion of the peripheral wall, and thereby forming a cylindrical body having a substantially oval cross-section and opening in the introduction port (120). Additionally, as illustrated in FIG. 3, the introducing unit (11) is provided in a posture in which long sides of the cylindrical body are inclined at 45 degrees in a counter-clockwise direction with respect to a front side (14) of the main burner body unit (12).

In the above-described peripheral wall of the introducing unit (11), a surface facing to a diagonally right front direction along the long side includes a fan installation surface (13) to which a connection flange (21) of the fan case (2) described later is connected. Accordingly, the fan installation surface (13) stands perpendicularly on the upper surface of the main burner body unit (12) in the posture diagonally inclined at 45 degrees with respect to the front side (14) of the main burner body unit (12). Further, a substantially rectangular inlet port (10) opens at a position displaced rearward from a center of the fan installation surface (13).

At respective predetermined positions in the vicinity of both ends of an upper side of the inlet port (10) in the fan installation surface (13), positioning protrusions (15a), (15b) are protruded. Moreover, in a central portion between the pair of positioning protrusions (15a), (15b), and at predetermined positions in the vicinity of both ends of a lower side of the inlet port (10), screw holes (16a), (16b), (16c) are formed, respectively.

A check valve (50) as a backflow prevention member is inserted through the inlet port (10) into the introducing unit (11) in such a manner that acid vapor ascending from the second heat exchanger (32) does not flow back to the fan case (2) and further the mixing device (22) through the burner body (1), after combustion of the flat burner (3) is turned off (FIG. 2).

The fan case (2) is of a spiral scroll casing type. An outer diameter of a disk-shaped fan housing part (27) in which the fan is housed is set shorter than a length in the front-and-rear direction of the main burner body unit (12) of the burner body (1). Moreover, a blowout port (not shown), which is an open end of a flow channel (20) on a downstream side continuous to an outer circumferential surface of the fan housing part (27), opens in a diagonally left rear direction in plan view from a motor (M) side.

The substantially rectangular connection flange (21) extends outward from a periphery of the open end of the flow channel (20). Moreover, as illustrated in FIG. 2, when the connection flange (21) is opposed to the fan installation surface (13), a pair of positioning holes (25a), (25b) into which the positioning protrusions (15a), (15b) can be inserted are opened at positions corresponding to these positioning protrusions (15a), (15b). Moreover, at positions corresponding to the screw holes (16a), (16b), (16c) are opened three screw insertion holes (26a), (26b), (26c) into which screw shafts of screws (5a), (5b), (5c) capable of being screwed into these screw holes (16a), (16b), (16c) can be inserted.

In order to attach the burner body (1) above the first and second heat exchangers (31), (32) accommodated in the casing body (101) of the casing (100) in a state communicating with the first and second heat exchangers (31), (32), and connect the connection flange (21) to the fan installation surface (13) having the inlet port (10) of the introducing part (11) of the burner body (1) in such a manner that the fan installation surface (13) is opposed to the blowout port of the fan case (2), the positioning protrusions (15a), (15b) of the fan installation surface (13) are inserted into the positioning holes (25a), (25b) of the connection flange (21), respectively, so that the connection flange (21) is superimposed on the fan installation surface (13) in a positioned state. The screw holes (16a), (16b), (16c) of the fan installation surface (13) are respectively provided so as to correspond to the screw insertion holes (26a), (26b), (26c) of the connection flange (21) in this state. Accordingly, from a side of the opening (103) of the casing body (101), the three screws (5a), (5b), (5c) are inserted into the screw insertion holes (26a), (26b), (26c) of the connection flange (21), respectively, to further screw into the screw holes (16a), (16b), (16c), which allows the fan case (2) to be connected in a communicated state with the burner body (1) on the right side of the introducing unit (11) of the burner body (1).

As described above, the fan installation surface (13) of the introducing unit (11) is provided so as to face to the diagonally right front direction in a substantially central portion in the left-and-right direction closer to the front side (14) of the main burner body unit (12). Moreover, the connection flange (21) of the fan case (2) to be connected to the fan installation surface (13) is provided above the main burner body unit (12) so as to face to the diagonally left rear direction. Accordingly, in the state where the connection flange (21) is connected to the fan installation surface (13) with the screws (5a), (5b), (5c), as illustrated in FIG. 3, the fan case (2) lying on its side is installed in such a manner that a predetermined area including the flow channel (20) on the downstream side overlaps the upper surface of the main burner body unit (12) as viewed from above. This shortens a length in the left-and-right direction of an assembly in which the fan case (2) is connected to the burner body (1) by this overlapping area. Moreover, since the outer diameter of the fan housing part (27) of the fan case (2) is set shorter than the length in the front-and-rear direction of the main burner body unit (12), the length in the front-and-rear direction of the assembly does not exceed that of the main burner body unit (12).

Particularly, in the assembly, the fan case (2) is installed on the upper surface of the main burner body unit (12) in such a manner that an imaginary plane including the fan installation surface (13) crosses the fan housing part (27) of the fan case (2). Accordingly, above the main burner body unit (12), a space in a diagonally right rear direction of the introducing unit (11) does not become a dead space, and this space can be effectively utilized to install a part of the fan housing part (27) of the fan case (2).

The assembly in which the fan case (2) is connected to the burner body (1) in this manner is smaller in the front-and-rear direction and in the left-and-right direction than a conventional assembly in which a fan installation surface (13) is provided substantially perpendicular to a front side (14) of a main burner body unit (12) to face to the right or left direction. Accordingly, a lateral width and a depth of the casing (100) in which this assembly is accommodated can be made smaller.

Moreover, as described above, the fan installation surface (13) of the introducing unit (11) of the burner body (1) is inclined so as to face to the diagonally right front direction. As illustrated in FIG. 3, of the screw holes provided in the fan installation surface (13), the screw hole (16c) located on the rearmost side is provided in such a manner that an imaginary extension line obtained by extending a center line of the screw hole (16c) to the front of the casing (100) passes an inside of the opening (103) without crossing a side wall (104a) on the right side of the casing body (101). Thereby, when the screw (5c) is inserted into the screw hole (16c) through the screw insertion hole (26c) and is screwed into the screw hole (16c) with a tool such as a screw driver, the side wall (104a) of the casing body (101) does not become a hindrance. Further, since when the tool is inserted into the casing body (101) from the opening (103), the tool can be disposed on a center line of the screw (5c), all the screws (5a), (5b), (5c) including the screw (5c) located on the rearmost side can be easily attached or detached from the front opening (103) provided with the door (102) of the casing (100).

In a hot-water supply operation of the water heater according to the embodiment, the flat burner (3) is ignited in response to supply of the water through the water supply pipe (38). Subsequently, the fan in the fan case (2) is rotated by the motor (M) to introduce the external air passing through the air supply pipe (23) and the fuel gas passing through the gas supply pipe (24) into the mixing device (22), and the air and the fuel gas are mixed to generate the mixture gas. In the water heater of the present embodiment, since the water supply pipe (38), the air supply pipe (23), the gas supply pipe (24), and the mixing device (22) are provided in a space below the fan case (2), an empty space inside the casing (100) can be effectively utilized, and a size of the casing (100) can be further made smaller.

Figure 4:
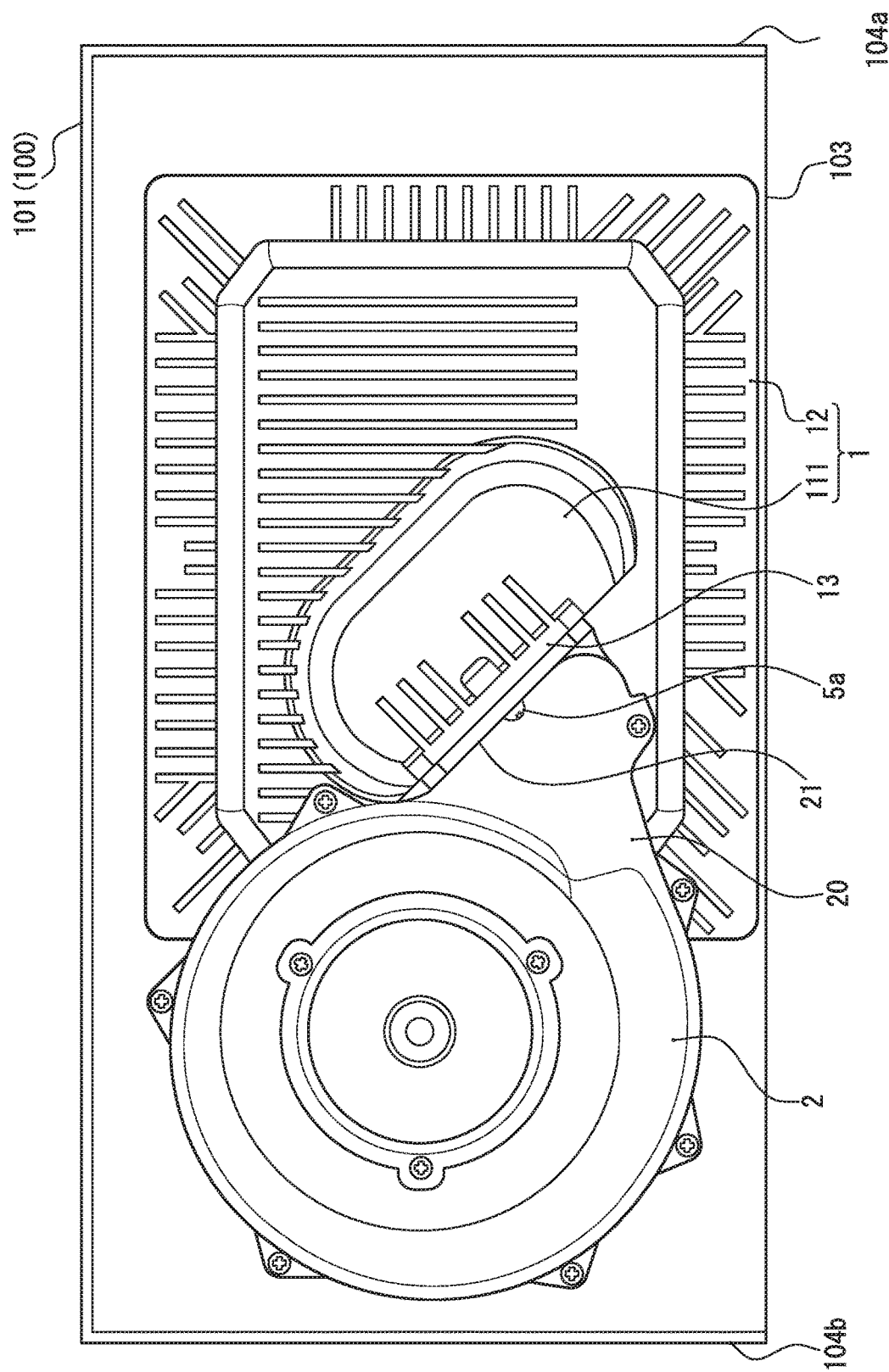
FIG. 4 is a schematic plan view showing one example of a burner body and a fan case of a water heater according to a second embodiment of the present invention.

While in the above-described first embodiment, the water heater including the clockwise centrifugal fan has been described, in a second embodiment, a water heater including a counterclockwise centrifugal fan will be described. As illustrate in FIG. 4, in the second embodiment, a fan case (2) is disposed on the left side of a burner body (1) inside a casing (100).

In this water heater, the burner body (1) provided so that a fan installation surface (13) of an introducing unit (11) faces to a diagonally left front direction is used. Moreover, the fan case (2) is used, in which a blowout port as an open end of a flow channel (20) on a downstream side opens toward a diagonally right rear direction, and a connection flange (21) extending from a periphery of the blowout port faces to the diagonally right rear direction. In the second embodiment, the fan installation surface (13) to which the connection flange (21) is connected faces to the diagonally front direction of the casing (100). Therefore, when the connection flange (21) is fixed to the fan installation surface (13) with screws from a side of an opening (103) of the casing (100), even the screw located on the rearmost side can be attached or detached without interference of a left side wall (104b) of a casing body (101).

Figure 5:
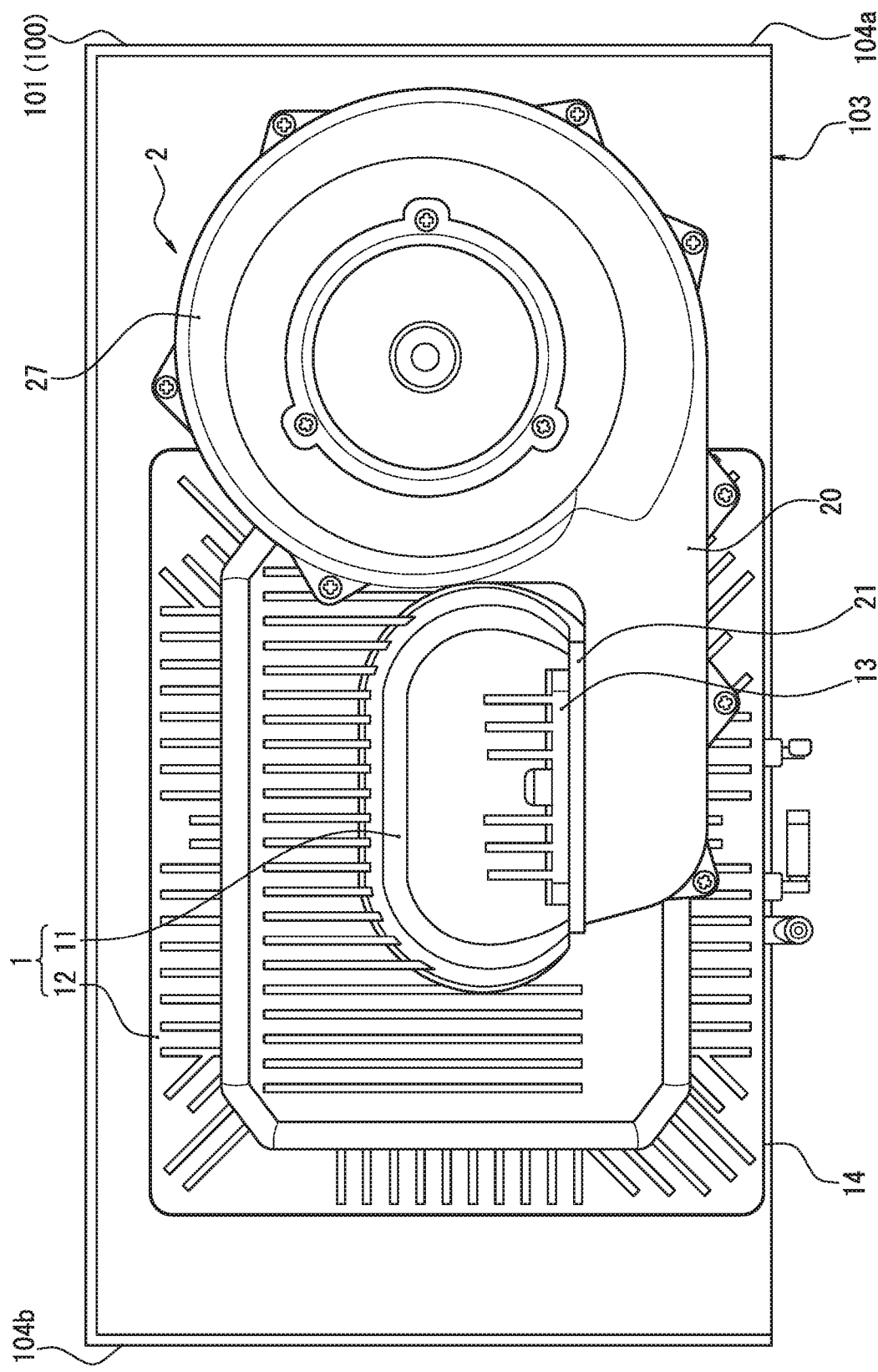
FIG. 5 is a schematic plan view showing one example of a burner body and a fan case of a water heater according to a third embodiment of the present invention.
Figure 6:
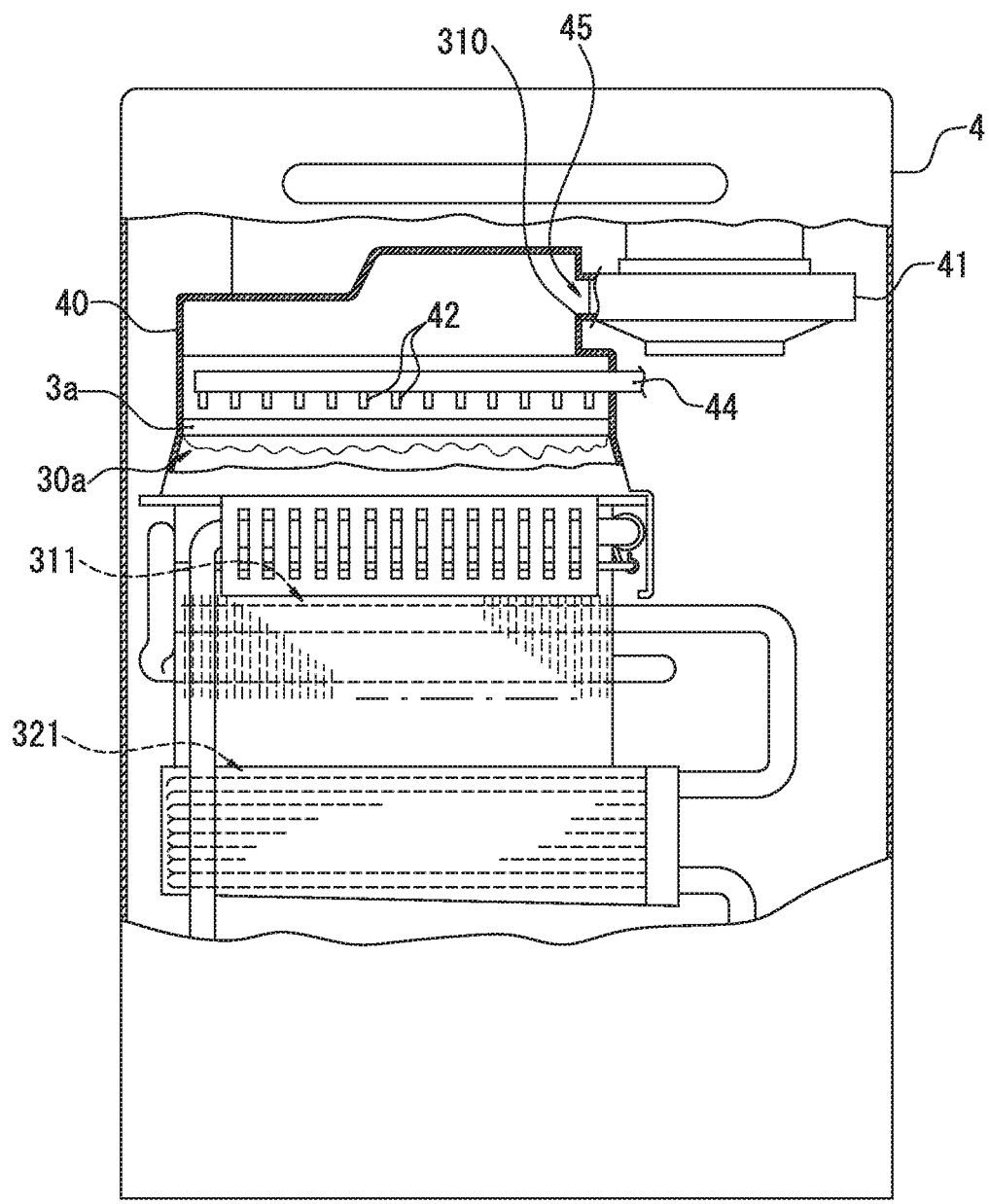
FIG. 6 is a schematic configuration view showing a water heater having a fan case lying on its side.

In the first and second embodiments, the fan installation surface (13) of the introducing unit (11) projected from the upper surface of the main burner body unit (12) is provided so as to be inclined diagonally at 45 degrees clockwise or counterclockwise in plan view with respect to the front side (14) of the main burner body unit (12). However, as described in a third embodiment in FIG. 5, an introducing unit (11) may be provided so that a fan installation surface (13) is located substantially parallel to a front side (14) of a main burner body unit (12). According to the third embodiment, when the connection flange (21) is installed to or removed from the fan installation surface (13), a tool can be easily inserted from a side of an opening (103) of the casing (100). As described above, when the clockwise fan is used, preferably, the fan installation surface (13) is provided so as to be within a range of about 0 degree to about 45 degrees counterclockwise in plan view with respect to the front side (14) of the rectangular shaped main burner body unit (12). When the counterclockwise fan is used, preferably, the fan installation surface (13) is provided so as to be within a range of about 0 degree to about 45 degrees clockwise in plan view with respect to the front side (14).

As described above, in any of the first to third embodiments, the fan installation surface (13), which is formed in the one side surface of the introducing unit (11), and to which the connection flange (21) is fixed with the screws, is provided so as to face to the front direction or the diagonally front direction of the casing (100). Accordingly, the fan case (2) and the introducing unit (11) are connected so that a part of the fan case (2) overlaps the upper surface of the main burner body unit (12). This can make smaller the assembly in which the burner body (1) and the fan case (2) are connected, and this can also make smaller the casing (100) in which the assembly is accommodated.

Moreover, regardless of the rotation direction of the fan, in the installation and removal of the fan case (2), an operator can perform the work while visually checking an installation position from the opening (103) on the front side of the casing (100). Further, since the side wall (104a) or (104b) does not become the hindrance when the tool is used, the installation of the fan case (2) in assembly and the removal of the fan case (2) in maintenance can be easily performed, whereby workability can be enhanced.

As described in detail, the present invention is summarized as follows.

According to one aspect of the present invention, there is provided a water heater comprising a casing including a casing body having an opening in a front portion, and a door configured to open and close the opening, wherein the casing accommodates, a burner body including a flat burner having a downward combustion surface, a fan case lying on its side in such a manner that a suction port configured to take in air opens downward, and a blowout port communicating with the burner body to blow out the air opens laterally, a fan disposed inside the fan case and configured to supply a mixture gas of combustion air and fuel gas into the burner body, and a motor provided above the fan case and configured to rotate the fan, wherein the burner body includes a main burner body unit having the flat burner on a lower surface thereof, and an introducing unit that is projected from a predetermined position of an upper surface of the main burner body unit, is communicated with the main burner body unit, and has an inlet port opposed to the blowout port of the fan case, a side surface of the introducing unit where the inlet port opens has a fan installation surface connected to the blowout port of the fan case, the fan case includes a scroll casing, and the fan includes a clockwise or counterclockwise centrifugal fan in plan view from a motor side, wherein when the fan includes the clockwise centrifugal fan, the fan case is installed on the right side of the burner body, and the fan installation surface is provided so as to face to a front direction or a diagonally right front direction, and when the fan includes the counterclockwise centrifugal fan, the fan case is installed on the left side of the burner body, and the fan installation surface is provided so as to face to the front direction or a diagonally left front direction.

According to the above-described water heater, the mixture gas blown from the blowout port of the fan case provided laterally to the burner body is fed to the introducing unit from the inlet port opposed to the blowout port in a communication state, and further introduced into the main burner body unit having the flat burner.

In a case where the fan housed in the fan case is the clockwise centrifugal fan, the introducing unit of the burner body has the fan installation surface provided so as to face to the front direction or the diagonally right front direction and accordingly, the fan case is disposed on the right side of the burner body. On the other hand, in a case where the fan housed in the fan case is the counterclockwise centrifugal fan, the introducing unit of the burner body has the fan installation surface provided so as to face to the front direction or the diagonally left front direction and accordingly, the fan case is disposed on the left side of the burner body.

Therefore, when the fan case is installed to the fan installation surface of the introducing unit projected from the upper surface of the burner body, a connecting surface between the introducing unit and the fan case is disposed above the main burner body unit. As a result, a part of the fan case is disposed so as to overlap the upper surface of the main burner body unit. Thus, when a length in the front-and-rear direction of the fan case is set shorter than that of the main burner body unit, a size of an assembly in which the fan case is connected to the burner body can be made smaller in the front-and-rear direction and in the left-and-right direction. This shortens a lateral length and a depth of an upper region of the casing.

Moreover, according to the above-described water heater, regardless of the rotation direction of the fan, the fan installation surface of the introducing unit, to which the fan case is installed, faces to the front direction or the diagonally front direction. Therefore, when the fan case is installed to the fan installation surface of the introducing unit, an operator can perform the work while visually checking an installation position from the opening of the casing body.

Preferably, in the above-described water heater, the fan installation surface is provided in such a manner that one imaginary plane including the fan installation surface crosses the fan case in a state where the fan case is installed to the fan installation surface.

As described above, when the clockwise centrifugal fan is used, the fan case is disposed on the right side of the burner body, and the fan installation surface of the introducing unit of the burner body faces to the front direction or the diagonally right front direction, for example. Thus, when the imaginary plane including the fan installation surface is extended to a right direction or a diagonally right rear direction, the fan case is located on an extension of the imaginary plane. Therefore, according to the installation structure, above the upper surface of the main burner body unit, a space in the right direction or the diagonally right rear direction of the introducing unit does not become a dead space, and this space above the main burner body unit can be effectively utilized as an installation space of the fan case. Thereby, since an area of the fan case overlapping the upper surface of the main burner body unit increases, the size of the assembly in which the fan case is connected to the burner body can be made further smaller.

Preferably, in the above-described water heater, the fan case has a connection flange extending outward from a periphery of the blowout port, the connection flange is fixed to the fan installation surface with a plurality of screws, and all the screws are provided in such a manner that an imaginary extension line obtained by extending an axial center line of each of the screws forward passes an inside of the opening of the casing body.

According to the above-described water heater, when the connection flange of the fan case is brought into contact with the fan installation surface of the introducing unit to fix the fan case to the introducing unit with the screws, or when the fan case is removed from the introducing unit in maintenance and the like, a tool such as a screwdriver can be brought into close to all the screws linearly from the opening of the casing main body. Therefore, when the tool is used, interference of the side wall of the casing body with the tool is prevented. Thereby, attachment and detachment of the screw can be easily performed by insertion of the tool from the opening of the casing, whereby the installation and removal of the fan case can be facilitated.

Preferably, the above-described water heater further comprises a mixing device configured to mix the combustion air and the fuel gas, wherein the mixing device is disposed in a space projecting sideward out of the main burner body unit below the fan case.

According to the above-described water heater, an empty space below the fan case can be effectively utilized, whereby a size of the casing can be made further smaller.

As described above, according to the present invention, since the fan case is disposed laterally to the burner body in such a manner that a part of the fan case overlaps the upper surface of the burner body, and the fan case is within a length in the front-and-rear direction of the burner body, the size of the assembly in which the fan case is connected to the burner body can be made smaller in the front-and-rear direction and in the left-and-right direction. Moreover, since the fan case lying on its side is accommodated in the casing, a size of the up-and-down direction can be made smaller. Thereby, the sizes of the front-and-rear direction, the left-and-right direction, and the up-and-down direction of the casing accommodating the assembly can be made smaller, whereby a smaller casing can be used.

Further, according to the present invention, since the fan installation surface of the introducing unit of the burner body, to which the fan case is installed, is provided so as to face to the front direction or the diagonally front direction, the operator can see the installation position from the opening during the work such as the installation of the fan case in assembly and the removal of the fan case in maintenance.

Thereby, workability can be enhanced.

Although the present invention has been described in detail, the foregoing descriptions are merely exemplary at all aspects, and do not limit the present invention thereto. It should be understood that an enormous number of unillustrated modifications maybe assumed without departing from the scope of the present invention.

INDUSTRIAL APPLICABILITY

According to the present invention, there is provided the water heater having a compact casing excellent in workability.

What is claimed is:

1. A water heater comprising a casing including a casing body having an opening in a front portion, and a door configured to open and close the opening, wherein the casing accommodates, a burner body including a flat burner having a downward combustion surface, a fan case lying on its side in such a manner that a suction port opens downward, and a blowout port communicating with the burner body opens laterally, a fan disposed inside the fan case and configured to supply a mixture gas of combustion air and fuel gas into the burner body, and a motor provided above the fan case and configured to rotate the fan, wherein the burner body includes a main burner body unit having the flat burner on a lower surface thereof, and an introducing unit that is projected from a predetermined position of an upper surface of the main burner body unit, is communicated with the main burner body unit, and has an inlet port opposed to the blowout port of the fan case, a side surface of the introducing unit where the inlet port opens has a fan installation surface connected to the blowout port of the fan case, the fan case includes a scroll casing, and the fan includes a clockwise or counterclockwise centrifugal fan in plan view from a motor side, wherein when the fan includes the clockwise centrifugal fan, the fan case is installed on the right side of the burner body, and the fan installation surface is provided so as to face to a front direction or a diagonally right front direction, and when the fan includes the counterclockwise centrifugal fan, the fan case is installed on the left side of the burner body, and the fan installation surface is provided so as to face to the front direction or a diagonally left front direction.

2. The water heater according to claim 1, wherein the fan installation surface is provided in such a manner that one imaginary plane including the fan installation surface crosses the fan case in a state where the fan case is installed to the fan installation surface.

3. The water heater according to claim 2, wherein the fan case has a connection flange extending outward from a periphery of the blowout port, the connection flange is fixed to the fan installation surface with a plurality of screws, and all the screws are provided in such a manner that an imaginary extension line obtained by extending an axial center line of each of the screws forward passes an inside of the opening of the casing body.

4. The water heater according to claim 3, further comprising a mixing device configured to mix the combustion air and the fuel gas, wherein the mixing device is disposed in a space projecting sideward out of the main burner body unit below the fan case.

5. The water heater according to claim 2, further comprising a mixing device configured to mix the combustion air and the fuel gas, wherein
the mixing device is disposed in a space projecting sideward out of the main burner body unit below the fan case.

6. The water heater according to claim 1, wherein
the fan case has a connection flange extending outward from a periphery of the blowout port,
the connection flange is fixed to the fan installation surface with a plurality of screws, and
all the screws are provided in such a manner that an imaginary extension line obtained by extending an axial center line of each of the screws forward passes an inside of the opening of the casing body.

7. The water heater according to claim 6, further comprising a mixing device configured to mix the combustion air and the fuel gas, wherein
the mixing device is disposed in a space projecting sideward out of the main burner body unit below the fan case.

8. The water heater according to claim 1, further comprising a mixing device configured to mix the combustion air and the fuel gas, wherein
the mixing device is disposed in a space projecting sideward out of the main burner body unit below the fan case.

* * * * *